US010735559B2

(12) United States Patent
Gibis

(10) Patent No.: US 10,735,559 B2
(45) Date of Patent: Aug. 4, 2020

(54) LIMITED-RESOURCE JAVA CARD DEVICE

(71) Applicant: GIESECKE+DEVRIENT MOBILE SECURITY GMBH, München (DE)

(72) Inventor: Oliver Gibis, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 16/308,918

(22) PCT Filed: Jun. 9, 2017

(86) PCT No.: PCT/EP2017/000679
§ 371 (c)(1),
(2) Date: Dec. 11, 2018

(87) PCT Pub. No.: WO2017/215782
PCT Pub. Date: Dec. 21, 2017

(65) Prior Publication Data
US 2019/0335017 A1    Oct. 31, 2019

(30) Foreign Application Priority Data

Jun. 14, 2016   (DE) .................. 10 2016 007 189

(51) Int. Cl.
*G06F 8/61*         (2018.01)
*G06Q 20/34*       (2012.01)
(Continued)

(52) U.S. Cl.
CPC ............... *H04L 67/34* (2013.01); *G06F 8/61* (2013.01); *G06F 21/128* (2013.01); *G06F 21/44* (2013.01);
(Continued)

(58) Field of Classification Search
CPC .. G06Q 20/3574; G06Q 20/341; H04L 67/34; G06F 21/57; G06F 8/61; G06F 21/128; G06F 21/44
(Continued)

(56) References Cited

U.S. PATENT DOCUMENTS 8,196,131 B1 *  6/2012  von Behren ......... G06Q 20/367
                                                           705/64
9,972,005 B2 *  5/2018  Wong ................... G06Q 20/322
(Continued)

OTHER PUBLICATIONS

"GlobalPlatform Card Specification Version 2.2.1," GlobalPlatform, Jan. 2011, 303 Pages.
(Continued)

Primary Examiner — Marina Lee
(74) Attorney, Agent, or Firm — Workman Nydegger

(57) ABSTRACT

A card device is adapted to accept a load packet for an applet and to process and apply to the load packet an INSTALL command in order to prompt an installation of an instance of the applet in the card device. The INSTALL command is adapted to set up in the card device an application identifier comprised in the loading package that relates to the instance of the applet to be installed. The INSTALL command is adapted to install the applet instance while considering the application identifier and to set up in the card device at least one further application identifier that relates to the same instance of the applet.

14 Claims, 3 Drawing Sheets

(51) Int. Cl.
*H04L 29/08* (2006.01)
*G06F 21/12* (2013.01)
*G06F 21/44* (2013.01)
*G06F 21/57* (2013.01)

(52) U.S. Cl.
CPC ........... *G06F 21/57* (2013.01); *G06Q 20/341* (2013.01); *G06Q 20/3574* (2013.01)

(58) Field of Classification Search
USPC .......................................... 717/121, 168–178
See application file for complete search history.

(56) References Cited

U.S. PATENT DOCUMENTS

| | | | | |
|---|---|---|---|---|
| 10,402,814 | B2* | 9/2019 | Wong | G06Q 20/327 |
| 10,477,393 | B2* | 11/2019 | Lopez | G06F 21/44 |
| 2005/0102679 | A1* | 5/2005 | Susser | G06F 9/468 |
| | | | | 719/315 |
| 2015/0127529 | A1* | 5/2015 | Makhotin | G06Q 20/08 |
| | | | | 705/39 |
| 2015/0178724 | A1* | 6/2015 | Ngo | G06Q 20/32 |
| | | | | 705/71 |
| 2015/0288686 | A1 | 10/2015 | Pepin et al. | |
| 2016/0217452 | A1* | 7/2016 | Wong | H04L 9/0869 |
| 2016/0292670 | A1* | 10/2016 | Lu | G06F 21/77 |
| 2018/0232722 | A1* | 8/2018 | Wong | H04L 9/0869 |
| 2019/0335017 | A1* | 10/2019 | Gibis | G06Q 20/341 |

OTHER PUBLICATIONS

"Java Card(TM) 2.2 Virtual Machine Specification," Sun Microsystems, Inc., Jun. 2002, 302 Pages.

German Office Action from DE Application No. 10 2016 007 189.3, dated May 18, 2017.

International Search Report from PCT Application No. PCT/EP2017/000679, dated Sep. 6, 2017.

* cited by examiner

LIMITED-RESOURCE JAVA CARD DEVICE

FIELD OF THE INVENTION

The invention relates to a resource-limited card device, in particular a card device based on the Java card technology or the native technology, in particular a chip card, a chip card module, or a chip card module in a housing of any form factor. The card device can in particular be equipped with the functionality of a payment transaction card or with a SIM functionality (SIM=subscriber identity module for mobile communication). The invention further relates to a load packet and to a method for implementing one or several applet instances in such a resource-limited card device.

PRIOR ART

A resource-limited card device comprises a microprocessor having an operating system (OS) implemented thereon (e.g. Java card OS or native OS) and an applet memory for implementing applets. Functionalities of the card device are achieved by applets implemented in the card device. For example, one or several payment transaction applets are implemented in a card device with the functionality of a payment transaction card. For a card device with SIM functionality (SIM=subscriber identity module) for using a mobile-communication capable terminal in a mobile communication network, one or several SIM-specific applets are implemented in the card device.

The loading of an applet into a card device by means of APDU commands is specified in the document [1] Global Card Platform Specification V2.2.1, 2011, hereinafter also referred to by the official short reference GPC_SPE_034. According to [1] GPC_SPE_034, chapter 9, in particular chapter 9.3, an applet is installed in a card device in that a load packet for the applet is loaded into the card device with a LOAD command (9.3.2), and an applet instance of the applet is installed in the card device with the content of the load packet with an INSTALL command (9.3.3 ff). According to [1] GPC_SPE_034, chapter 9.3.6, page 84, upon the installation of the applet instance by means of the INSTALL command, it is ensured in particular with an OPEN command subsequently executed upon prompting by INSTALL that the applet identifier AID of the applet is stored in the registry of the Java card device. This circumstance is represented in FIG. 9-2 (page 92) by the entry "install and register Application". According to [1] GPC_SPE_034, chapter 11, the structure of the INSTALL APDU command is described. According to sub-chapter 11.5.2.3.2, table 11-43, the application AID of an applet to be installed is transferred in the data field of the INSTALL command, namely in the sub-field "Application AID".

According to [1] GPC_SPE_034, each applet to be installed thus has exactly one application identifier AID.

In a payment transaction card which accommodates several payment transaction applets and which is to be usable in several countries and/or which supports several access possibilities (in particular contactless/contact-type), a separate applet AID must be provided for each constellation of, for example, applet, country and access possibility. Since each applet has only one single AID, conventionally for each constellation of, for example, applet and country of use and access possibility, an individual, separate applet instance is installed. For example, instance 1) applet A in country X contact-type; 2) applet A in country Y contact-type; 3) applet B in country X contact-type; 4) applet B in country Y contact-type; 5) applet A in country X contactless; 6) applet A in country Y contactless; etc. The multiplicity of applet instances requires much memory. In contrast, all applet instances which are based on the same applet, the applet B, for example, are largely identical functionally. In the examples mentioned, each constellation is determined by certain parameter values of one or several parameters. In the above examples, the parameters are the contacting type to the card and the country. The parameter values are contactless and contact-type and different countries.

[1] GPC_SPE, chapter 11.5.2.3.7, "INSTALL Command Parameters", discloses that under the "Load Parameters" of an INSTALL command, which are comprised in the INSTALL command, optionally or exclusively, the parameters designated as the "System Specific Parameters" can be contained. These are system-specific parameters which are specific for the system under consideration and, in dependence on the system, can have different contents that are freely selectable to a certain extent.

OBJECT OF THE INVENTION

The invention is based on the object of creating a card device which makes possible a memory-saving installation of applets which are intended to be provided in different configurations. Further, a method is to be specified for implementing one or several applet instances in such a resource-limited card device.

SUMMARY OF THE INVENTION

The object is achieved by a card device according to claim 1 and a load packet and a method according to the independent claims. Advantageous embodiments of the invention are specified in the dependent claims.

The card device according to the invention according to claim 1 is adapted to accept a load packet for an applet and to process and apply to the load packet an INSTALL command, in order to prompt an installation of an instance of the applet in the card device. The INSTALL command is further adapted to set up in the card device an application identifier comprised in the load packet, said application identifier relating to the instance of the applet to be installed. The card device is characterized in that the INSTALL command is adapted, on the one hand, to install the applet instance while considering the application identifier (two alternative possibilities for this consideration are explained in the following) and, on the other hand, to set up in the card device at least one further application identifier that relates to the same instance of the applet. In this manner, it is made possible to create several identifiers for a certain applet, all of which identifiers relate to the same applet instance, with one INSTALL command. It is not necessary to create a separate applet instance for each application identifier. In particular, it is possible to make available different application identifiers for different configurations of an applet, with only one single underlying applet instance installed in the card device.

Consequently, according to claim 1, a card device is obtained which makes possible a memory-saving installation of applets in the card device.

According to a first possibility (alternative) for providing several application identifiers, the application identifier and the at least one further application identifier are simultaneously contained in the same load packet. In this case, the INSTALL command is arranged such that the applet instance is so installed while considering the application identifier that, upon the processing of one single INSTALL command, only one single applet instance is installed in the card device, and in addition, the application identifier and the at least one further application identifier are set up in the card device.

According to a second possibility (alternative) for providing several identification identifiers, the load packet for the application identifier to be created in the card device and the at least one further application identifier to be created in the card device contains only one single application identifier (AID1=AID2). In this case, the applet instance is installed while considering the application identifier in such a manner that the INSTALL command is adapted to set up the application identifier and the at least one further application identifier in the card device by loading the load packet into the card device at least twice consecutively, wherein, upon the first loading of the load packet, an applet instance is set up in the card device and the application identifier is set up, and, upon each further loading of the load packet, a further application identifier is set up without a further applet instance being created in the card device. In so doing, the card device thus detects in the second, third, . . . INSTALL command for an applet instance that an installed applet instance is already present in the card device. Consequently, no further applet instance is installed in the card device, but only a further application identifier. Upon the first INSTALL an applet instance is of course created as well.

Optionally, the application identifier—and in the first alternative optionally the at least one further application identifier—is provided in the load packet in the INSTALL command in the System Specific Parameters.

The card device is optionally adapted to store the application identifier and the at least one further application identifier in a registry of the card device.

The card device is adapted, for example, as a chip card module or as a chip card or as a chip card module implemented in a housing of a different construction type than that of a chip card.

The card device further comprises an operating system, in particular a Java card operating system or a native operating system.

In a method according to the invention for creating an applet identifier in a card device, associated with an instance of the applet to be installed in the card device, by means of a load packet, the following steps are comprised according to a first possibility (alternative). 1) Loading the load packet into the card device, wherein an application identifier that relates to the instance of the applet to be installed is comprised in the load packet. 2) Installing an instance of the applet in the card device while applying an INSTALL command to the load packet. 3) Upon prompting by the INSTALL command, setting up the application identifier in the card device. The method is characterized in that at least one further application identifier that relates to the same instance of the applet to be installed is comprised in the load packet, and in that the method comprises the further step of: 4) setting up the at least one further application identifier in the card device. Thus, an applet instance and two or more applet identifiers are created in the card device with one INSTALL command.

In a method according to the invention for creating an applet identifier in a card device, associated with an instance of the applet to be installed in the card device, by means of a load packet, the following steps are comprised according to a second possibility (alternative). 1) Loading the load packet into the card device, wherein an application identifier that relates to the instance of the applet to be installed is comprised in the load packet. Preferably, in this case the load packet, as usual, contains only one single applet identifier per applet. 2) Optionally installing the instance of the applet in the card device while applying an INSTALL command to the load packet. 3) Upon prompting by the INSTALL command, setting up the application identifier in the card device. The method is characterized in that 4) the loading of the load packet is carried out at least twice consecutively, wherein 5) upon the first loading of the load packet (or upon the first execution of the INSTALL command) the installation of the instance of the applet is carried out (i.e. in step 2) the option "applet installation") and the application identifier is set up in the card device, and 6) upon each further loading of the load packet (or execution of the INSTALL command) a further application identifier is set up in the card device without a further instance of the applet being set up in the card device (i.e. in step 2) the option "no installation of applet instance"). The loading in step 2) is optional to the extent that an applet instance is installed in the device only upon the first-time loading of the load packet or upon the first-time application of the INSTALL command, however not upon subsequent further loading processes or executions of the INSTALL command.

Optionally, the card device comprises a registry, and the setup of the application identifier and/or of the further application identifier comprises the storage of the application identifier and/or further application identifier in the registry, or the setup consists in the storage in the registry.

According to further developments of the invention, a parameter is assigned to the applet. Further, different parameter values of the parameter of the applet are assigned to the application identifier and to the further application identifier. The applet is parameterized by the parameter. As a result, a configuration of the applet is produced for the applet by means of the parameter. Different parameter values of the parameter lead to different configurations of the applet. Several configurations of the applet are thus realized with one single applet instance and several application identifiers, without several applet instances being installed in the card device.

Optionally one or several of the following are provided as parameters and parameter values: (1) as a parameter the contacting type for contacting the card device or the applet, and as different parameter values contact-type and contactless contacting type; (2) as a parameter a country in which the card device or the applet is used, and as different parameter values different countries.

According to one embodiment of the invention, (at least or exactly) two parameters are assigned to the applet, namely the type of contacting and the country of use. Different configurations of the applet can thereby be produced.

Optionally, a SIM (of any form factor) for a mobile communication device is provided as the card device, wherein in the SIM applets are provided having a different functionality than SIM, for example payment transaction applets, wherein the application identifiers AIDs according to the invention relate to the applets of different functionality, for example the payment transaction applets.

According to further embodiments of the invention, applet instances for different applets are installed in the card device. Optionally, there is (are) present in the card device one (or at least one) set up application identifier that is assigned to applet instances of two different applets. For example, in the card device there are an instance of applet A, an instance of applet B and an AID that is directed both at the instance of applet A and at the instance of applet B.

The following example shows a card device having two applet instances for two different applets, namely applet A and applet B, which can be parameterized with two parameters P1, P2.

First parameter P1: country; parameter values: country X (home country, e.g. country of a mobile communication contract), country Y, country Z (other countries).

Second parameter P2: contacting type; possible parameter values: contact-type or contactless.

Applet A: virtual credit card domestic.

Applet B: virtual credit card international.

Target: certain combinations Kn of the first parameter P1 and the second parameter P2 are intended to cause in targeted manner that either the applet A or the applet B is used.

Concrete Examples of Targets:

K1: The applet A provided for the home country is to be used in the home country X in the contact-type mode.

K2: In the countries Y, Z, the international applet B is to be used always.

K3: In the contactless mode, the international applet B is also to be used in the home country X.

Implementation: The applet A has only one application identifier AID-A. The applet B has two application identifiers AID-INT-B and AID-DOM-NFC-B.

AID-A: application identifier applet A.

AID-INT-B: application identifier applet B international.

AID-DOM-NFC-B: application identifier applet B domestic contactless.

K1: An access to the card device with parameters P1=X, P2=contact-type and application identifier AID-A leads to the applet A.

K2: An access to the card device with parameters P1=Y or Z, P2=contact-type or contactless and application identifier AID-INT-B leads to the applet B.

K3: An access to the card device with parameters country P1=X, P2=contactless and application identifier AID-DOM-NFC-B leads to the applet B.

BRIEF DESCRIPTION OF THE DRAWINGS

In the following the invention will be explained in more detail on the basis of embodiment examples and with reference to the drawing, in which there are shown.

DETAILED DESCRIPTION OF EMBODIMENT EXAMPLES

Figure 1:
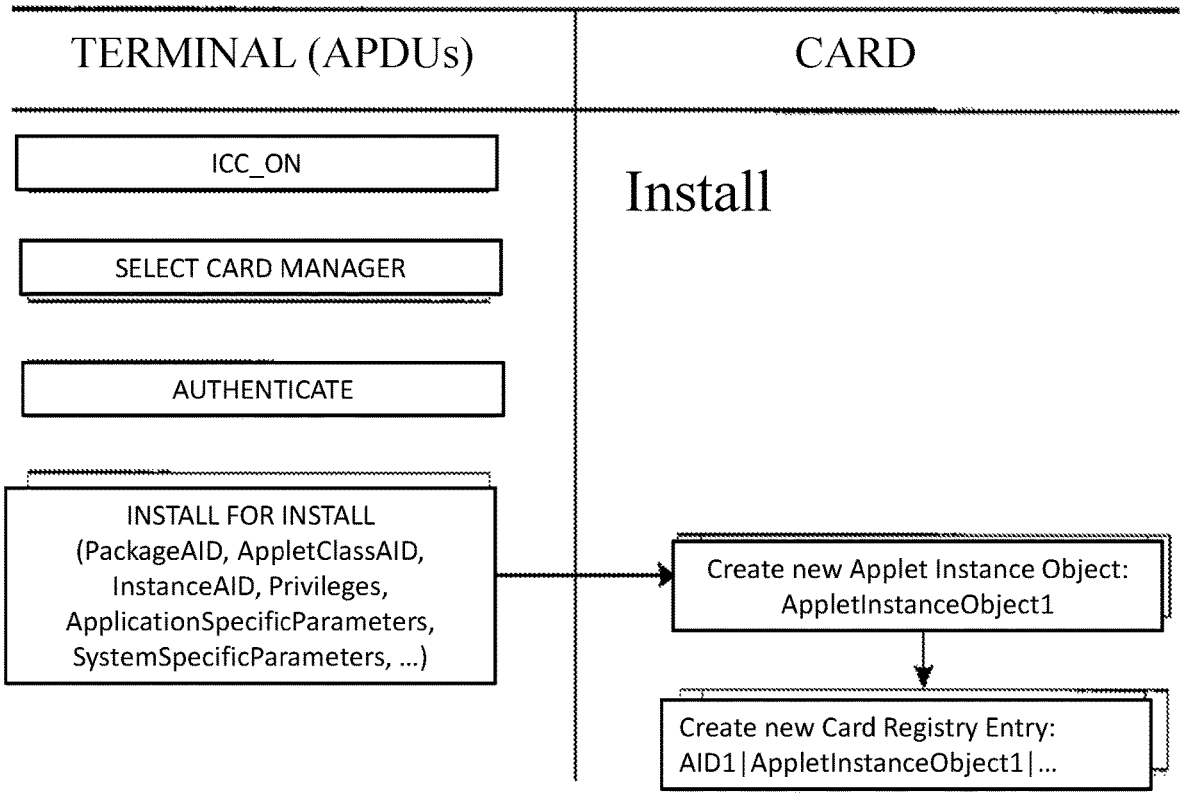
FIG. 1 the installation of an applet instance by the first-time sending of a load packet, according to embodiments of the invention.

FIG. 1 shows the installation ("INSTALL") of an applet instance by the first-time sending of a load packet, according to embodiments of the invention.

A terminal sends APDU commands to the card device (card used here as short term). With the command ICC_ON, the terminal switches the card device on. The card manager is called with APDU SELECT Card Manager. An authentication is carried out with APDU AUTHENTICATE. With the APDU command INSTALL FOR INSTALL, a load packet is loaded into the card device and an applet instance Applet Instance Object 1 is set up in the card device by creating an applet instance object there with "Create new". Further, the applet identifier AID1 of the applet, which is sent along in the System Specific Parameters of the INSTALL, is set up in the card device by entering a new card registry entry (entry) in the card registry of the card device by means of CREATE new.

Figure 2:
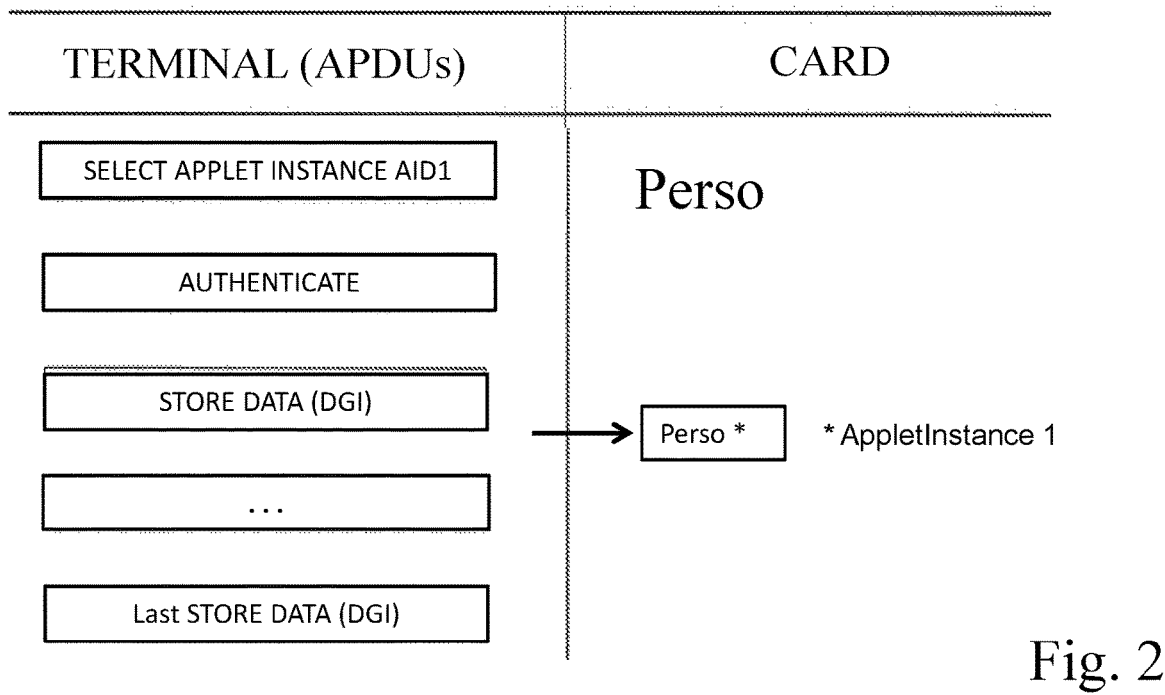
FIG. 2 the personalization of an applet instance installed in accordance with FIG. 1, according to embodiments of the invention.

FIG. 2 shows the personalization ("Perso") of an applet instance Applet Instance Object 1 installed in accordance with FIG. 1. The applet instance is selected with APDU SELECT and specifying the AID1. An authentication is carried out with APDU AUTHENTICATE. The data necessary for the personalization are stored in the card device with several consecutive APDU STORE DATA, up to a LAST STORE DATA, which indicates the end of the personalization data. The card device, more precisely the installed applet instance Applet Instance Object 1, is personalized ("Perso") thereby.

Figure 3:
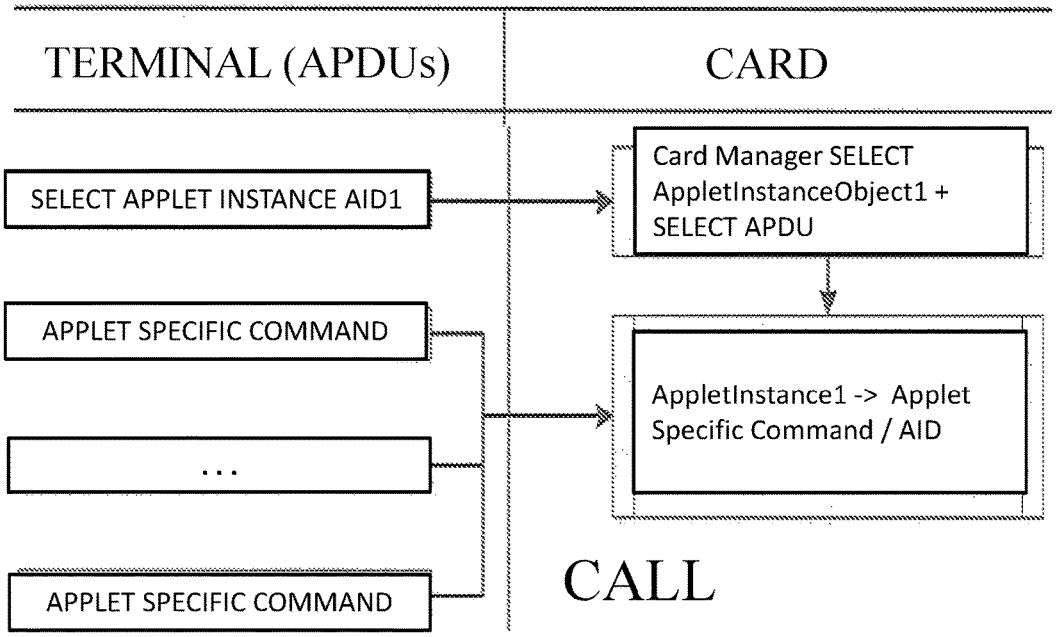
FIG. 3 the calling of an applet with AID1 and subsequent processing of commands, according to embodiments of the invention.

FIG. 3 shows the calling ("CALL") and use of an applet with AID1 and subsequent processing of commands, after the installation of an applet according to FIG. 1 and personalization of the applet according to FIG. 2. The applet instance is selected with APDU SELECT and specifying the AID1. Various applet-specific APDU commands ("Applet Specific Commands") are sent consecutively from the terminal to the card device.

More precisely, the card manager selects the applet instance APPLET Instance Object 1 on the card device by means of SELECT and sends APDUs received from the terminal to the APPLET Instance Object. As a result, the applet (more precisely the applet instance Applet Instance Object 1) executes its intended activity on the card device.

Figure 4:
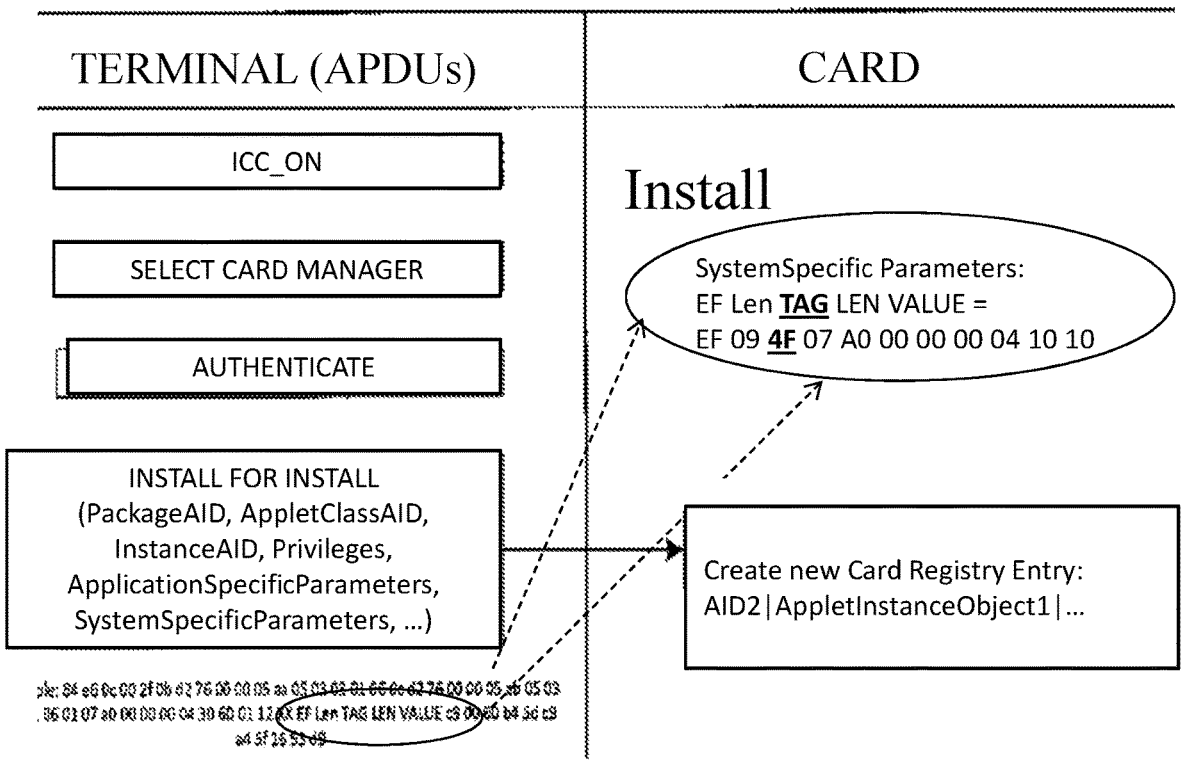
FIG. 4 the setup of a further applet identifier without the installation of a further applet instance, according to embodiments of the invention.

FIG. 4 shows the creation of a further applet identifier by means of a further INSTALL FOR INSTALL command, without a further applet instance being installed in the card device, according to embodiments of the invention. A terminal sends APDU commands to the card device (card used here as short term). With the command ICC_ON, the terminal switches the card device on. The card manager is called with APDU SELECT Card Manager. An authentication is carried out with APDU AUTHENTICATE. With the APDU command INSTALL FOR INSTALL, a load packet is loaded into the card device. The card device detects that an applet instance Applet Instance Object 1 has already been set up in the card device and does not install any further applet instance. Further, the applet identifier AID1 of the applet is detected that was created in the System Specific Parameters of the INSTALL upon the previous INSTALL FOR INSTALL upon creating the applet instance. Further, according to the invention, a further applet identifier AID2 is set up in the card device by entering a new card registry entry (entry) AID2 in the card registry of the card device by means of CREATE new. Now the registry contains two applet identifiers AID1 and AID2 for one and the same applet instance Applet Instance Object 1. Further applet identifiers AIDn, n=3, 4, . . . can be created by repeating the sending of the INSTALL FOR INSTALL command. According to an alternative approach for creating applet identifiers, several applet identifiers AID1, AID2, . . . are sent simultaneously in the INSTALL command from the terminal to the card device. FIG. 4 further shows an example for creating the System Specific Parameters, in order to accommodate an applet identifier. The INSTALL for INSTALL command comprises a series of loading parameters, in particular Package AID, Applet Class AID, Instance AID, Privilege, Application Specific Parameters, System Specific Parameters, and possibly more, all of which are all listed in [1]. The System Specific Parameters have the command format EF Len TAG LEN VALUE (TLV format). For TAG, some values are permanently assigned according to [1], for example C6, C7 and C8 (cf. [1], chapter 11.5.2.3.7, "INSTALL Command Parameters"). Preferably, a value that is not permanently assigned, for example 4F, is used for TAG.

Figure 5:
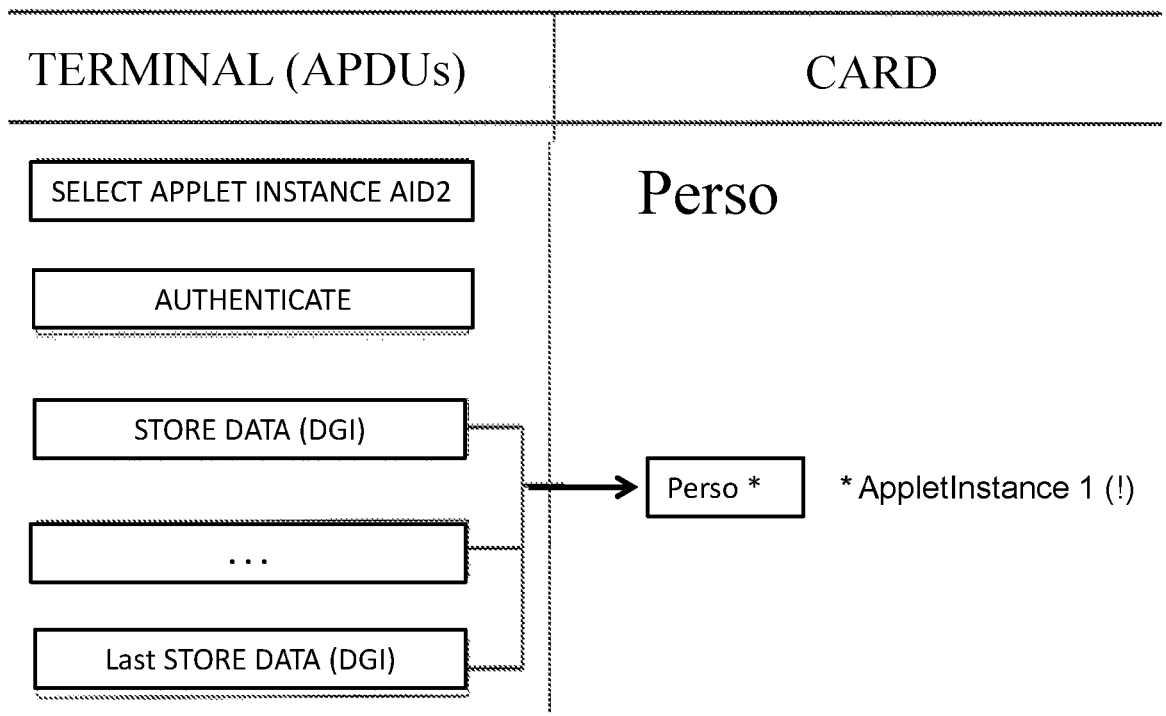
FIG. 5 the personalization of an installed applet instance, according to embodiments of the invention.

FIG. 5 shows the personalization ("Perso") of an installed applet instance, according to embodiments of the invention. With APDU SELECT and specifying one of the several AIDs, here the AID2, the applet instance is selected, in this case the Applet Instance Object 1 (not 2!). An authentication is carried out with APDU AUTHENTICATE. The data required for the personalization are stored in the card device with several consecutive APDU STORE DATA, up to a LAST STORE DATA, which indicates the end of the personalization data. The card device is personalized ("Perso") thereby.

Figure 6:
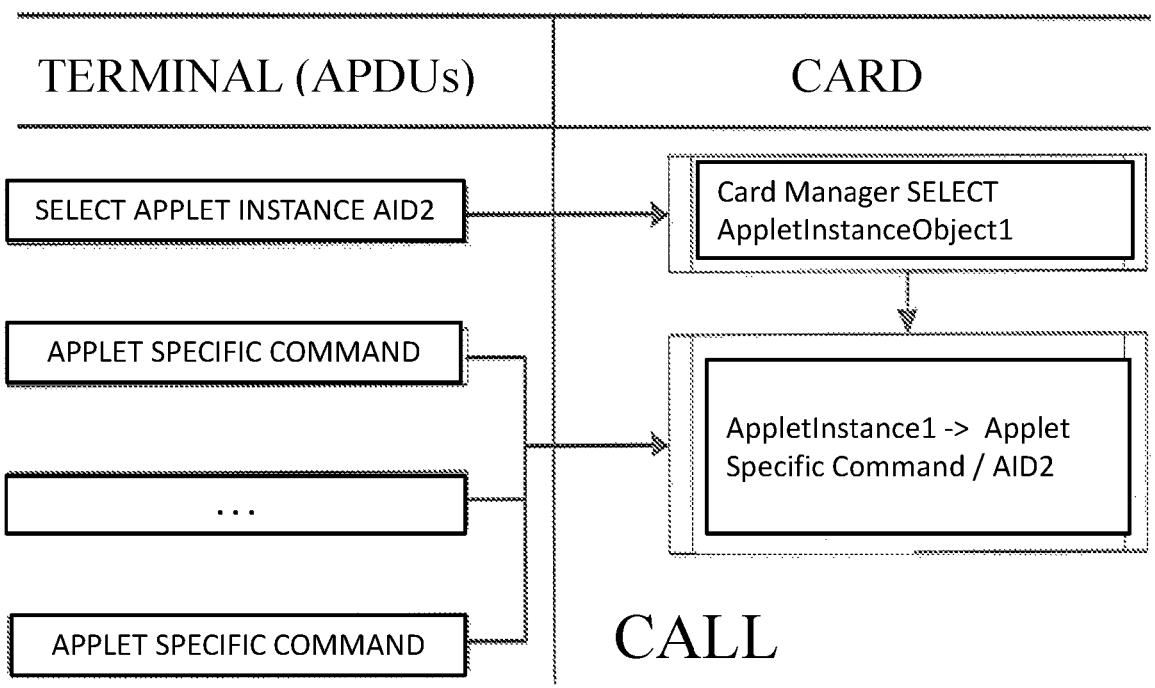
FIG. 6 the calling of an applet with AID2 and subsequent processing of commands, according to embodiments of the invention.

FIG. 6 shows the calling ("CALL") and use of an applet with a further applet identifier AID2 and a subsequent processing of commands, according to an embodiment of the invention. The applet instance is selected with APDU SELECT and specification of the further applet identifier AID2. Various applet-specific APDU commands ("Applet Specific Commands") are sent consecutively from the terminal to the card device. More precisely, the card manager selects the APPLET Instance Object 1 (not 2) on the card device by means of SELECT and sends APDUs received from the terminal to the APPLET Instance Object 1. As a result, the applet (more precisely the applet instance 1) on the card device executes its intended activity, initiated by the further applet identifier AID2, and relating to one and the same applet instance 1.

CITED PRIOR ART

[1] [GPC_SPE_034] Global Card Platform Specification V2.2.1, 2011

The invention claimed is:
1. A card device comprising:
a microprocessor; and
a memory,
wherein the card device is adapted to accept a load packet for an applet and to process and apply to the load packet an INSTALL command, in order to prompt an installation of an instance of the applet in the card device, wherein the INSTALL command is adapted to set up in the card device an application identifier comprised in the load packet, which application identifier relates to the instance of the applet to be installed,
wherein the INSTALL command is adapted to:
install the applet instance while considering the application identifier; and
set up in the card device at least one further application identifier that relates to the same instance of the applet.
2. The card device according to claim 1, wherein the application identifier and the at least one further application identifier are simultaneously contained in the same load packet, and wherein the applet instance is so installed while considering the application identifier that with the processing of a single INSTALL command only one single applet instance is installed in the card device, and the application identifier and the at least one further application identifier are set up in the card device.
3. The card device according to claim 1, wherein the load packet for the application identifier and the at least one further application identifier contains only one single application identifier, and
wherein the applet instance is so installed while considering the application identifier that the INSTALL command is adapted to set up the application identifier and the at least one further application identifier in the card device by loading the load packet into the card device at least twice consecutively,
wherein, upon the first loading of the load packet, an applet instance is set up in the card device and the application identifier is set up and, upon each further loading of the load packet, one of the at least one further application identifiers is set up without a further applet instance being created in the card device.
4. The card device according to claim 1, wherein in the load packet the application identifier and optionally the at least one further application identifier is provided in the INSTALL command in the System Specific Parameters.
5. The card device according to claim 1, adapted to store the application identifier and the at least one further application identifier in a registry of the card device.
6. The card device according to claim 1, adapted as a chip card module or as a chip card or as a chip card module implemented in a housing of a different construction type than that of a chip card.
7. The card device according to claim 1, further comprising an operating system, in particular a Java card operating system or a native operating system.
8. A card device according to claim 1, wherein at least one parameter is assigned to the applet, and wherein different parameter values of the parameter are assigned to the application identifier and the further application identifier.
9. A method for creating an applet identifier in a card device, associated with an instance of the applet to be installed in the card device, by means of a load packet, comprising the steps of:
loading the load packet into the card device, wherein in the load packet an application identifier is comprised that relates to the instance of the applet to be installed;
installing an instance of the applet in the card device while applying an INSTALL command to the load packet;
upon prompting by the INSTALL command, setting up the application identifier in the card device;
wherein in the load packet at least one further application identifier is comprised that relates to the same instance of the applet to be installed,
and in that the method comprises the further step of:
setting up the at least one further application identifier in the card device.
10. The method according to claim 9, wherein the card device comprises a registry, and
wherein the setup of the application identifier and/or of the further application identifier comprises the storing of the application identifier and/or further application identifier in the registry or consists in the storing in the registry.
11. A method according to claim 9, wherein at least one parameter is assigned to the applet, and wherein different parameter values of the parameter are assigned to the application identifier and the further application identifier.

12. The card device or method according to claim 11, wherein one or several of the following are provided as the parameters and parameter values:
- (1) parameter country in which the card device or applet is used, with different countries as different parameter values;
- (2) parameter contacting type of the card device or of the applet, with contact-type and contactless as different parameter values.

13. The card device or method according to claim 11, wherein applet instances for different applets are installed in the card device, and
    wherein at least one application identifier set up in the card device is assigned to instances of two different applets.

14. A method for creating an applet identifier in a card device, associated with an instance of the applet to be installed in the card device, by means of a load packet, comprising the steps of:

loading the load packet into the card device, wherein in the load packet an application identifier is comprised that relates to the instance of the applet to be installed;

optionally installing the instance of the applet in the card device while applying an INSTALL command to the load packet;

upon prompting by the INSTALL command, setting up the application identifier in the card device;

wherein the loading of the load packet is carried out at least twice consecutively, wherein, upon the first loading of the load packet, the installation of the instance of the applet is carried out and the application identifier is set up in the card device, and wherein, upon each further loading of the load packet, a further application identifier is set up in the card device without a further instance of the applet being set up in the card device.

* * * * *